US007298353B2

(12) United States Patent
Li

(10) Patent No.: US 7,298,353 B2
(45) Date of Patent: Nov. 20, 2007

(54) DRIVING METHOD OF A MULTI-DOMAIN VERTICAL ALIGNMENT LIQUID CRYSTAL DISPLAY

(75) Inventor: Wang-Yang Li, Tainan Science Based Industrial Park (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 559 days.

(21) Appl. No.: 11/032,426

(22) Filed: Jan. 10, 2005

(65) Prior Publication Data

US 2005/0168434 A1 Aug. 4, 2005

(30) Foreign Application Priority Data

Jan. 30, 2004 (TW) .............................. 93102247 A

(51) Int. Cl.
*G09G 3/36* (2006.01)
*G02F 1/1337* (2006.01)

(52) U.S. Cl. ............................ 345/87; 345/55; 345/84; 345/87; 349/123; 349/144

(58) Field of Classification Search .................. 345/30, 345/54, 55, 84, 87, 95, 96, 97; 349/123, 349/144
See application file for complete search history.

(56) References Cited

U.S. PATENT DOCUMENTS 6,922,183 B2 * 7/2005 Ting et al. .................... 345/87

* cited by examiner

*Primary Examiner*—Richard Hjerpe
*Assistant Examiner*—My-Chau T. Tran
(74) *Attorney, Agent, or Firm*—Thomas, Kayden, Horstemeyer & Risley

(57) ABSTRACT

A driving method of a multi-domain vertical alignment (MVA) liquid crystal display (LCD). The LCD, which receives an image signal and displays a frame according to the image signal received, includes a plurality of scan lines. The driving method according to the invention initially enables one of the scan lines, then determines whether to proceed with resetting the enabled scan line or not. If the enabled scan line is to be reset, a low voltage is applied to the pixels on the enabled scan line. If the enabled scan line is not to be reset, the image signal is applied to the pixels on the enabled scan line.

7 Claims, 4 Drawing Sheets

DRIVING METHOD OF A MULTI-DOMAIN VERTICAL ALIGNMENT LIQUID CRYSTAL DISPLAY

CROSS REFERENCE TO RELATED APPLICATION

This application claims the benefit of Taiwan application Serial No. 93102247, filed Jan. 30, 2004, the subject matter of which is incorporated herein by reference.

TECHNICAL FIELD

The invention relates in general to a driving method of a multi-domain vertical alignment (MVA) liquid crystal display (LCD), and more particularly to a driving method for resolving the frame retention problem of an MVA LCD.

BACKGROUND

Compared with a conventional cathode-ray tube (CRT) display, a flat-panel display has gradually become the mainstream in the display market for lighter and slimmer, high quality frame displays. Of the flat-panel displays, the thin-film-transistor liquid crystal display (TFT LCD) plays an essential role. However, ordinary TFT LCDs have restricted applications due to narrow visual angles.

With the feature of broader visual angles, the multi-domain vertical alignment (MVA) LCD has become a target for the display industry to achieve.

FIGS. 1A-1C are top views of an MVA LCD pixel. Transparent electrode 110 of the pixel includes four domains, wherein the four domains are interlinked. FIG. 1A shows a schematic diagram of the pixel before a voltage is applied. The liquid crystal molecules are perpendicular to the plane of the transparent electrode 110, so only one end point of the liquid crystal molecules can be seen in the top view, wherein the end point is denoted by a circular point. FIG. 1B shows a schematic diagram of the pixel after a voltage is applied. When a voltage is applied to the pixel, the liquid crystal molecules tilt toward the center of the four domains, enabling the user to view the screen frame at a broader angle of view.

FIGS. 2A-2C are top views of another MVA LCD pixel. FIG. 2A is a schematic diagram of the pixel before a voltage is applied, wherein slit 21 is disposed at the lower panel of the LCD while protrusion 22 is disposed at the upper panel of the LCD. FIG. 2B is a schematic diagram of the pixel after a voltage has been applied. When a voltage is applied to the pixel, the liquid crystal molecules tilt according to respective electric field direction and split into multiple domains.

However, when an external driving force, such as an electric field or the user's touch, is applied to the MVA LCD, mura appears on the display screen. The liquid crystal molecules, having received the external driving force, would not be aligned in accordance with original designed directions. FIG. 1C and FIG. 2C are schematic diagrams showing the pixel having received the external driving force. After receiving the external driving force, the alignment directions of the liquid crystal molecules is disordered, causing the penetration rate of the liquid crystal to change. When the external force is removed, mura still remains on the screen, leading to the quality defect of frame retention.

SUMMARY

It is therefore an object of the invention to provide a driving method of multi-domain vertical alignment (MVA) liquid crystal display (LCD) preventing the occurrence of mura effect or frame retention.

One embodiment of the present invention is directed to a driving method of a MVA LCD. The LCD, which receives an image signal and displays a frame accordingly, includes a plurality of scan lines. The driving method first enables one of the scan lines, then determines whether to proceed with resetting the scan line. If the scan line is reset, a low voltage is applied to the pixels on the scan line. If the scan line is not reset, the image signal is applied to the pixels on the scan line.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
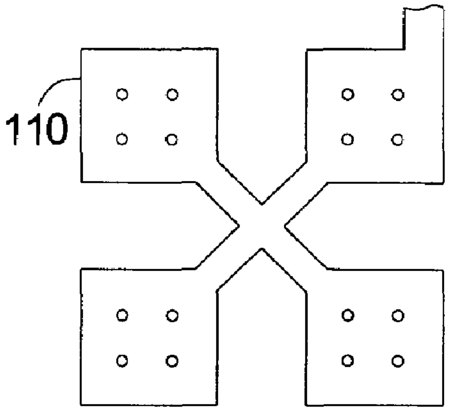
FIGS. 1A-1C are top views of an MVA LCD pixel.
Figure 1B:
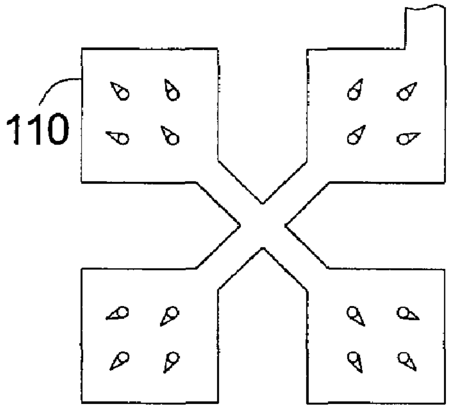
Figure 1C:
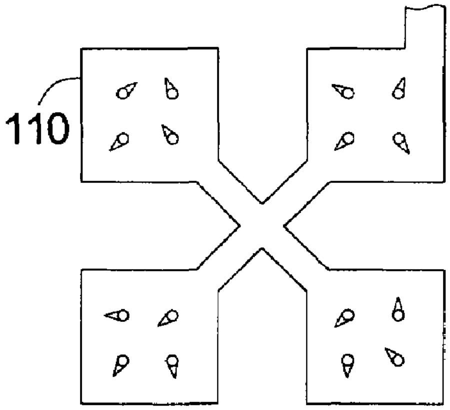
Figure 2A:
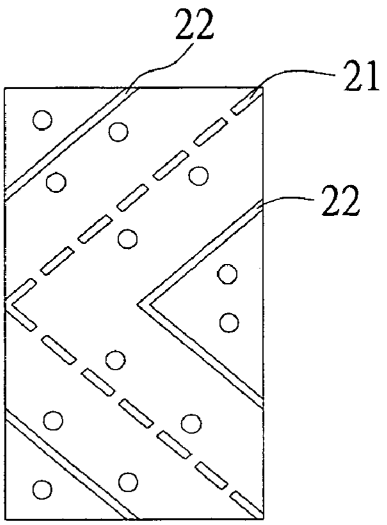
FIGS. 2A-2C are top views of another MVA LCD pixel.
Figure 2B:
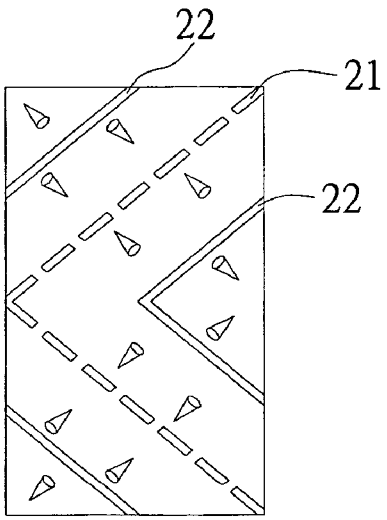
Figure 2C:
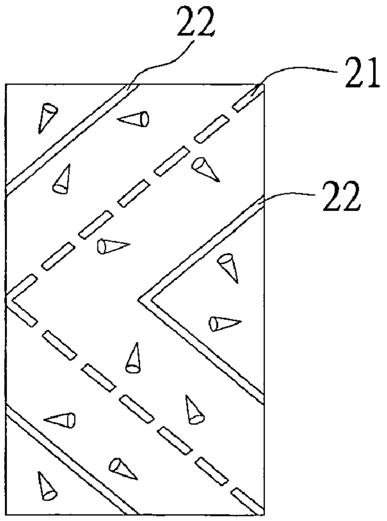
Figure 3A:
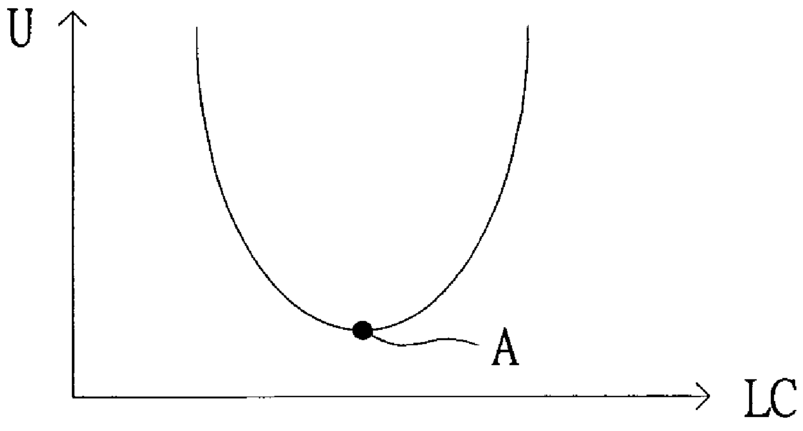
FIG. 3A shows the relation between free energy U and alignment direction LC before a voltage is applied on the liquid crystal molecules of the pixel.
Figure 3B:
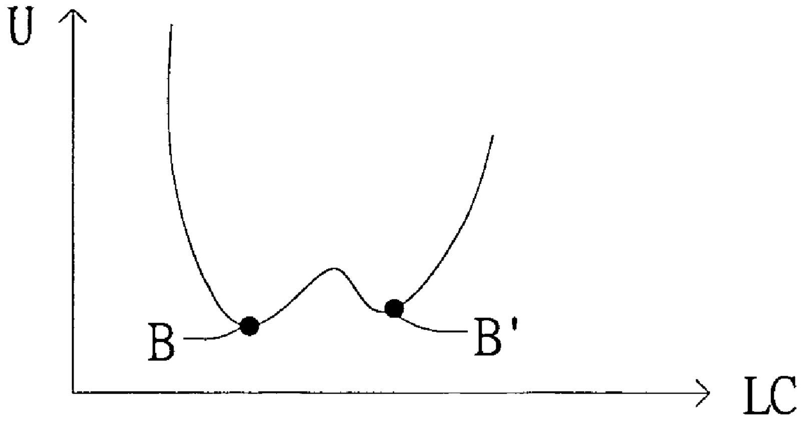
FIG. 3B shows the relation between free energy U and alignment direction LC after a voltage is applied on the liquid crystal molecules of the pixel.

When a multi-domain vertical alignment (MVA) liquid crystal display (LCD) receives an external force, for example, touched by a user, mura appears on the screen. FIG. 3A shows the relation between free energy U and alignment direction LC before a voltage is applied on the liquid crystal molecules of the pixel. When in a steady state, the liquid crystal molecules are at the lowest point of free energy as shown in point A. The alignment directions of the liquid crystal molecules are then perpendicular to the plane of the transparent electrode. FIG. 3B shows the relation between free energy U and alignment direction LC after a voltage, 6 volts for instance, is applied on the liquid crystal molecules of the pixel. The liquid crystal molecules now have a plurality of steady states, which are exemplified by two steady states points, B and B'. After receiving a voltage, the liquid crystal molecules are at the steady state point B. After receiving an external force with the voltage applied, the steady state of the liquid crystal molecules probably would shift to point B' such that the alignment directions are changed. When the external force is removed, the steady state of the liquid crystal molecules remains at point B'. This would change the penetration rate of the pixel and mura would appear on the force-applying part of the screen.

If a low voltage, 0 volts for instance, is applied to the liquid crystal molecules which are at the steady state point B' and followed by a pixel voltage, 6 volts for instance, then the liquid crystal molecules will return to the steady state of point B. The mura effect caused by the external force would be eliminated, and the screen would return to the normal status. The driving method of the embodiment eliminates the mura effect from the screen according to the above mentioned reset principle.

A conventional liquid crystal screen receives an image signal and displays a frame according to the image signal received. The driving method thereof is to enable a scan line of the liquid crystal screen, and then apply the pixel voltages, generated in response to the image signals, onto the pixels on the enabled scan line via data lines. Each of the scan lines is enabled once sequentially to complete a frame.

Figure 4:
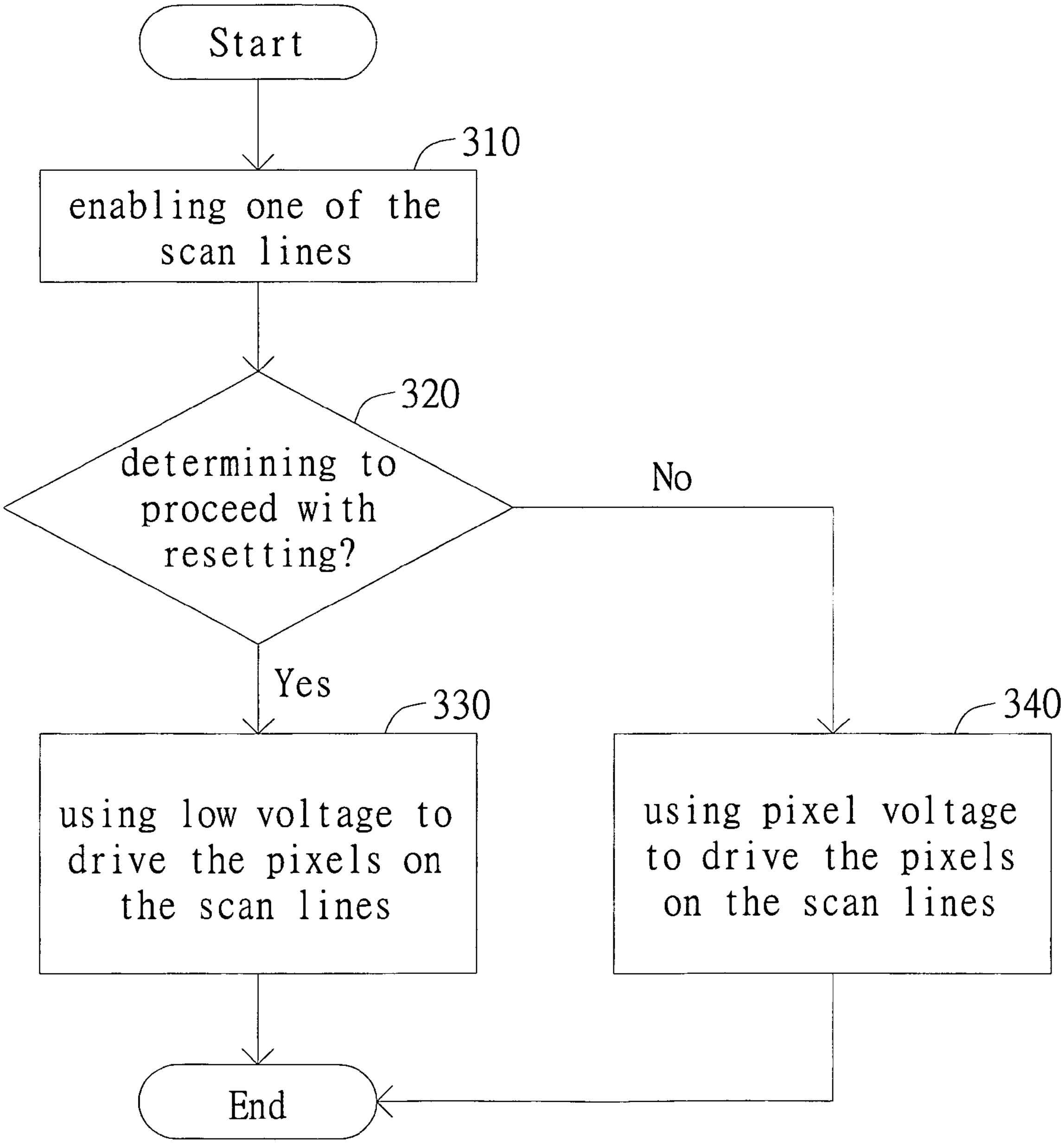
FIG. 4 is a flowchart for a driving method of an MVA LCD according to a preferred embodiment of the invention.

Referring to FIG. 4, a flowchart for a driving method of an MVA LCD according to a preferred embodiment of the invention is shown. First the driving method enables one scan line on the liquid crystal screen (step 310). Next, it determines whether to proceed to a resetting process (step 320). If the scan line is to be reset, a low voltage is applied to the pixels on the enabled scan line (step 330). If the scan line is not to be reset, pixel voltages are applied to the pixels on the enabled scan line (step 340).

In resetting step 330, after a low voltage, 0 volts for instance, is applied onto the pixel, the liquid crystal molecules return to the initial steady state illustrated in the steady state of point A in FIG. 3A. When the scan line is enabled again at the next frame, the liquid crystal molecules are able to achieve the proper steady state with the pixel voltage applied. Any mura caused by a previously exerted but now removed external force would be removed after the resetting process. The time required for the resetting process is very short and is not easily perceived by the human eye so the image quality is not affected.

The mura can be eliminated in 2 seconds if each of the scan lines is reset within 2 seconds. For a liquid crystal screen with a 60 Hz refresh rate, 60 frames are displayed per second. One way to reset all the scan lines in 2 seconds is to insert a resetting frame formed by the low voltage into any of the 120 frames within the 2 seconds.

Another way to reset all the scan lines in 2 seconds is to reset some of the scan lines each frame with all the scan lines being reset after 120 frames are displayed. For example, the scan lines are divided into an normal group and a reset group, wherein the scan lines of the normal group are driven by the original image signal, while the scan lines of the reset group are driven by the low voltage. With a liquid crystal screen having 1024 scan lines, by resetting 9 different scan lines (1024/(60*2)~=9) each frame, the mura can be eliminated in 2 seconds. For each frame, 9 scan lines belong to the reset group while the other 1015 scan lines belong to the normal group.

The above embodiment uses 0 volts as the low voltage to reset the scan lines. But in practice the low voltage may not need to be as low as 0 volts to reset the scan lines. The maximum resetting low voltage required is different depending on the grey value of the pixel. A reference table can be created showing the maximum resetting low voltage for each grey value by experimentation. During the driving process, the value of the low voltage required for resetting can be determined by the reference table and the image signal.

The driving method of MVA LCD disclosed in the above preferred embodiment eliminates the mura formed due to an external force to provide a satisfying high quality LCD.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A driving method of multi-domain vertical alignment (MVA) liquid crystal display (LCD), the LCD including a plurality of scan lines and receiving an image signal so as to display a frame, the driving method comprising:
- enabling one of the scan lines;
- determining whether to proceed with resetting the enabled scan line;
- driving the pixels on the enabled scan line by a low voltage, if the enabled scan line is to be reset; and
- driving the pixels on the enabled scan line in response to the image signal, if the enabled scan line is not to be reset.

2. The driving method according to claim 1, wherein the LCD displays a plurality of frames and one of the frames is driven by the low voltage.

3. The driving method according to claim 1, wherein the LCD receives a plurality of frames and the pixels on a part of the scan lines on each frame are driven by the low voltage.

4. The driving method according to claim 1, wherein the low voltage is generated in response to the image signal.

5. A driving method of an MVA LCD, the LCD including a plurality of scan lines and receiving an image signal so as to display a frame, the driving method comprising:
- determining whether to reset the frame or not;
- displaying the frame by a low voltage, if the frame is to be reset; and
- displaying the frame in response to the image signal, if the frame is not be reset.

6. A driving method of an MVA LCD, the LCD including a plurality of scan lines and receiving an image signal so as to display a frame driving method comprising:
- dividing the scan lines into a normal group and a reset group;
- sequentially enabling the scan lines;
- driving the pixels on the enabled scan line in response to the image signal, if the enabled scan line belongs to the normal group; and
- driving the pixels on the enabled scan line by a low voltage, if the enabled scan line belongs to the reset group.

7. The driving method according to claim 6, wherein the low voltage is generated in response to the image signal.

* * * * *